(12) United States Patent
Heibel

(10) Patent No.: US 6,181,759 B1
(45) Date of Patent: Jan. 30, 2001

(54) METHOD AND APPARATUS FOR DETERMINING NEARNESS TO CRITICALITY OF A NUCLEAR FUELED ELECTRIC POWER GENERATING UNIT

(75) Inventor: Michael D. Heibel, Irwin, PA (US)

(73) Assignee: Westinghouse Electric Company LLC, Pittsburgh, PA (US)

(*) Notice: Under 35 U.S.C. 154(b), the term of this patent shall be extended for 0 days.

(21) Appl. No.: 09/360,089

(22) Filed: Jul. 23, 1999

(51) Int. Cl.[7] .............................. G21C 7/08; G21C 17/108
(52) U.S. Cl. ........................ 376/214; 376/245; 376/254
(58) Field of Search .................................. 376/214, 215, 376/216, 219, 240, 254, 255

(56) References Cited

U.S. PATENT DOCUMENTS

| | | | |
|---|---|---|---|
| 4,582,672 | 4/1986 | Tuley, Jr. et al. | 376/254 |
| 4,588,547 | 5/1986 | Impink, Jr. et al. | 376/254 |
| 4,637,910 | 1/1987 | Impink, Jr. et al. | 376/216 |
| 4,655,994 | 4/1987 | Greenberg | 376/254 |
| 4,711,753 | 12/1987 | Impink, Jr. et al. | 376/216 |
| 4,853,174 | 8/1989 | Bednar et al. | 376/254 |
| 5,078,957 | 1/1992 | Tower et al. | 376/254 |
| 5,229,066 | 7/1993 | Impink, Jr. et al. | 376/258 |
| 5,406,598 | 4/1995 | Takeuchi et al. | 376/254 |
| 5,490,184 | 2/1996 | Heibel | 376/254 |
| 5,555,279 | 9/1996 | Nir et al. | 376/216 |

FOREIGN PATENT DOCUMENTS

| | | | |
|---|---|---|---|
| 2043593 | * | 2/1987 | (JP) . |
| 3096595 | * | 4/1988 | (JP) . |
| 363286793 | * | 11/1988 | (JP) . |
| 2110399 | * | 4/1990 | (JP) . |

* cited by examiner

Primary Examiner—Charles T. Jordan
Assistant Examiner—Kyongtack K. Mun

(57) ABSTRACT

A method is provided for determining the closeness to criticality of a nuclear reactor during start-up, comprising the steps of completing a control rod withdrawal step, thereby generating a change in an output signal of a neutron detector; measuring the output signal after the completion of the control rod withdrawal step and during a transient portion of the output signal; calculating the effective neutron multiplication factor ($K_{eff}$) based upon the measured output signal and elapsed time between output signal measurements; and determining the closeness to criticality of the nuclear reactor based upon the calculated value of the effective neutron multiplication factor ($K_{eff}$). The invention also encompasses apparatus used to perform the above method.

3 Claims, 2 Drawing Sheets

METHOD AND APPARATUS FOR DETERMINING NEARNESS TO CRITICALITY OF A NUCLEAR FUELED ELECTRIC POWER GENERATING UNIT

BACKGROUND OF THE INVENTION

This invention relates to the detection of conditions in a nuclear-fueled electric power-generating unit, and more particularly, to methods and apparatus for estimating the effective neutron multiplication factor in a nuclear reactor.

The power level of a nuclear reactor is generally divided into three ranges: the source or start-up range, the intermediate range, and the power range. The power level of the reactor is continuously monitored to assure safe operation. Such monitoring is typically conducted by means of neutron detectors placed outside and inside the reactor core for measuring the neutron flux of the reactor. Since the neutron flux at any point in the reactor is proportional to the fission rate, the neutron flux is also proportional to the power level.

Fission and ionization chambers have been used to measure flux in the intermediate and power range of a reactor. Such fission and ionization chambers are capable of operation at all normal power levels, however, they are generally not sensitive enough to accurately detect low level neutron flux emitted in the source range. Thus, separate low level source range detectors are typically used to monitor neutron flux when the power level of the reactor is in the source range.

U.S. Pat. No. 4,588,547 discloses a method and apparatus for determining the nearness to criticality of a nuclear reactor. That invention takes advantage of the fact that when the reactor is subcritical, the neutron flux generated by an artificial neutron source, and the direct progeny by fission, is higher than that generated by neutrons from natural neutron sources in the reactor fuel and progeny of those neutrons. However, that patent does not address the approach to criticality when a reactor approaches criticality due to withdrawal of control rods.

During the approach to reactor criticality, the signals from the source range detectors are typically used to determine whether the reactor is critical or will achieve criticality before the scheduled or planned core conditions are achieved. Assemblies of control rods in the form of control banks, are used to regulate reactor activity through controlled absorption of the neutrons released in the fission process. When a reactor is to be made critical by withdrawal of the control banks, which is the typical method used for all reactor startups following the initial startup in each operating cycle, changes in control bank position cause changes in the magnitude of the source range detector signals which are not entirely indicative of core reactivity changes. This behavior makes it difficult for the reactor operator to use the source range detector information properly. Ideally the reactor operator would like to be able to not only determine whether the reactor is currently critical, or is likely to be critical before the planned critical conditions are achieved, but how close to critical the core actually is. In order to accurately determine how close the reactor is to critical, a means of using the source range detector signal information that does not rely only on the magnitude of the signal change from one control bank configuration to another is required.

SUMMARY OF THE INVENTION

This invention provides a method for determining the closeness to criticality of a nuclear reactor during start-up, comprising the steps of completing a control rod withdrawal step, thereby generating a change in an output signal of a neutron detector; measuring the output signal after the completion of the control rod withdrawal step and during a transient portion of the output signal; calculating the effective neutron multiplication factor ($K_{eff}$) based upon the measured output signal and elapsed time between the output signal measurements; and determining the closeness to criticality of the nuclear reactor based upon the calculated value of the effective neutron multiplication factor ($K_{eff}$).

The invention also encompasses apparatus used to perform the above method.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

This invention allows the value of the sub-critical eigenvalue ($K_{eff}$), also referred to as the effective neutron multiplication factor, to be determined using measured source range detector signal change with respect to time information. The effective neutron multiplication factor is the ratio of the average rate of neutron production by fission to the average rate of loss by absorption and leakage. The system is critical if $K_{eff}=1$, subcritical if $K_{eff}<1$, and supercritical if $K_{eff}>1$.

Figure 1:
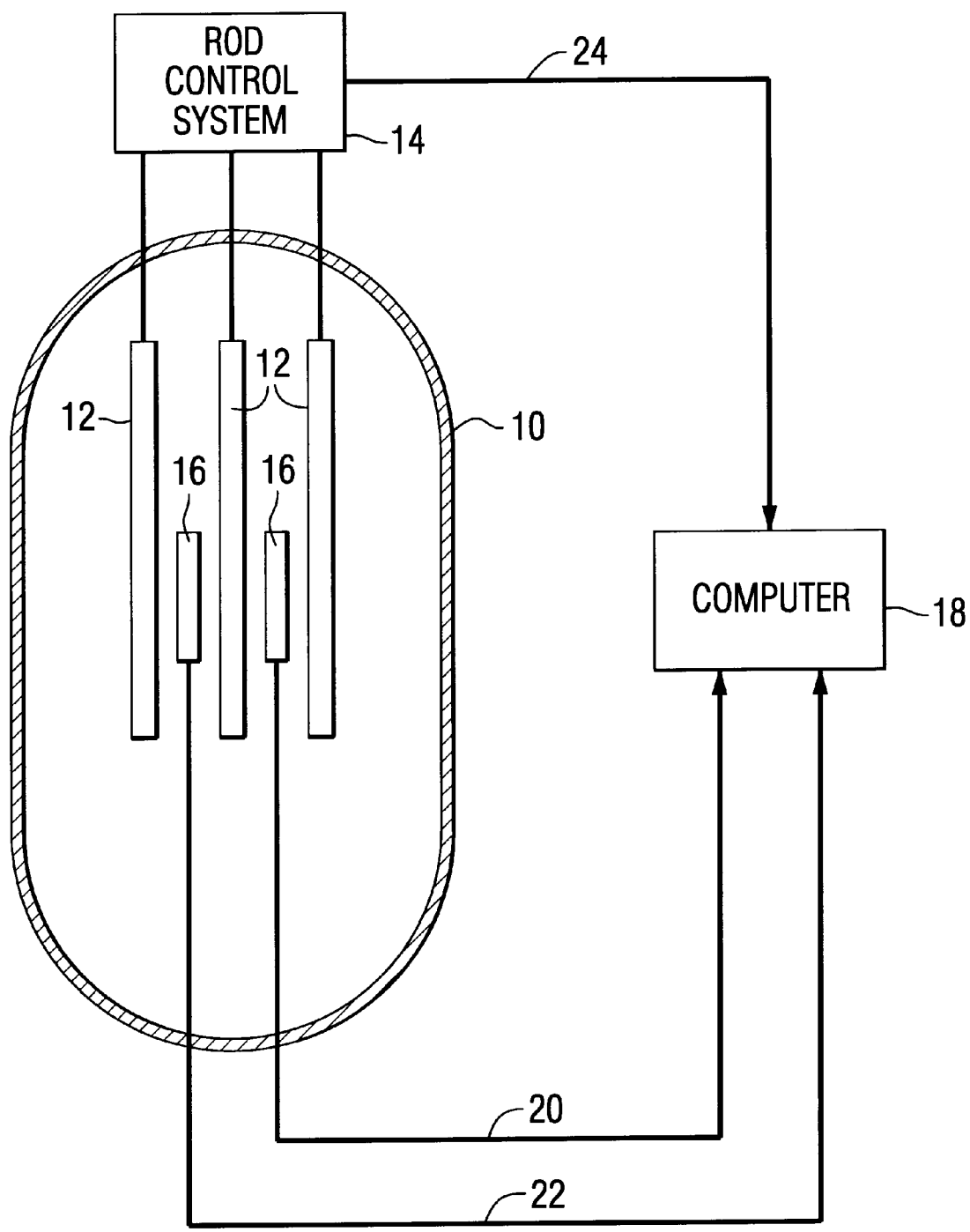
FIG. 1 is a diagrammatic representation of portions of a nuclear fueled electric power generating system used to practice the present invention.

Referring to the drawings, FIG. 1 is a simplified schematic representation of a reactor core 10 having a plurality of control rods 12 positioned inside the core. A rod control system 14 raises and lowers the rods within the reactor core. A plurality of source range detectors 16 are also positioned within the core. These detectors are connected to a computer 18 by conductors 20 and 22. The computer 18 receives signals from the source range detectors and also receives a signal indicating the status of the movement of the control rods on line 24. These signals are processed in accordance with the invention to achieve an estimate of the criticality of the reactor.

Figure 2:
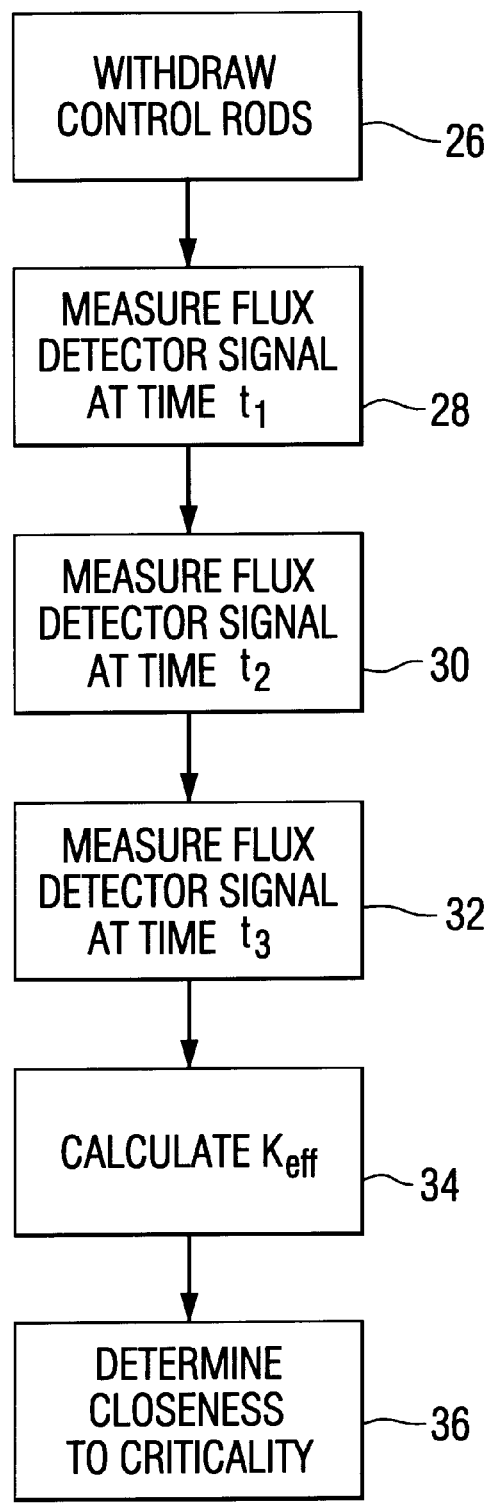
FIG. 2 is a flow diagram showing the principle steps used to carry out the method of the invention.

FIG. 2 is a flow diagram that illustrates the steps performed in practicing the method of the invention. In order to start the approach to criticality, block 26 shows that the control rods are withdrawn. After the withdrawal of the rods stops, the output signal from at least one neutron flux detector is recorded at time $t_1$ as shown in block 28. The output signal from the neutron detector will transition from the initially recorded level to a higher level. Block 30 shows that the output signal is recorded again at time $t_2$ during the transition. At the end of the transition, the signal is again recorded at time $t_3$ as shown in block 32. Based on the signal levels recorded in blocks 28, 30 and 32, the effective neutron multiplication factor is calculated as shown in block 34. Then the calculated factor is used to determine the closeness to criticality of the reactors as shown in block 36.

An apparatus used to perform the method of this invention is designated as the K-Effective Estimation Processing System (KEEPS). The KEEPS computations can be performed on various types of hardware such as a personal computer or workstation based computer platform. Typically, source range detector signal information, the corresponding time and date information, and the control bank motion status (moving or not moving) is input to the computer hardware executing the KEEPS calculation algorithms.

The instantaneous neutron flux period in a reactor when the control banks are being withdrawn, in the absence of spatial neutron flux changes, may be closely approximated by the Point-Kinetics based expression:

$$\frac{1}{n(t)}\frac{dn(t)}{dt} = \frac{\delta k(t) + \lambda_{eff}\delta k(t) + \frac{\lambda_{eff}l^*S_O}{n(t)}}{\overline{\beta} - \delta k(t)}$$

where:

$n(t)$ = neutron flux at time $t$-also equal to Source Range signal times a constant
$\delta k(t)$ = $K_{eff} - 1$
$\dot{\delta k}(t)$ = $\frac{dK_{eff}}{dt}$
$S_o$ = external neutron source strength
$\lambda_{eff}$ = effective 1-group neutron precursor decay constant
$\overline{\beta}$ = effective 1-group delayed neutron fraction
$l^*$ = effective neutron lifetime The values or these parameters would be readily available to one skilled in the art, since the values are routinely generated during the core design process. The term "period" typically refers to the time it takes the neutron flux to increase by a factor of e. The instantaneous period considers the fact that the period is changing as a function of time because reactivity is changing as a function of time. After the control banks stop moving, at time $t_s$, the instantaneous period may be expressed as:

$$\frac{1}{n(t_s)}\frac{dn(t_s)}{dt} = \frac{\lambda_{eff}\delta k(t_s) + \frac{\lambda_{eff}l^*S_O}{n(t_s)}}{\overline{\beta} - \delta k(t_s)}$$

After the control banks stop moving, the change in the source range detector signal with time is no longer influenced by the changes in the spatial distribution of the neutron flux. The assumptions inherent in the Point-Kinetics representation of the neutron flux dynamics become more valid. The value of $K_{eff}$ corresponding to the core condition immediately following completion of the control bank withdrawal may be determined by measuring the time required for the source range detector signal to achieve a specific fraction of it's equilibrium signal level at the current value of $K_{eff}$. The equilibrium value of the source range detector signal is determined from the source range signal value measured after the count rate stops increasing. This value can be determined from the point at which the startup rate returns to zero, or by a simple visual determination from either a graph of source range signal versus time, or by simply looking at a count rate meter located on a control panel. Conversely, the value of $K_{eff}$ may also be determined by measuring the relative change in the source range signal that occurs a specific time after the control banks stop moving. The above equation may be solved for n(t), for times greater than $t_s$ to yield:

$$n(t) = (n(t_s) - n(\infty))e^{\left(\frac{\lambda_{eff}\delta k(t_s)}{\overline{\beta}-\delta k(t_s)}\right)(t-t_s)} + n(\infty)$$

The above equation may be solved for $K_{eff}$ at time $t_s$ to yield:

$$K_{eff}(t_s) = 1 + \frac{\overline{\beta}}{1 + \frac{\lambda_{eff}}{\theta(t)}}$$

where:

$$\theta(t) = \frac{1}{(t-t_s)}\ln\left(\frac{n(t) - n(\infty)}{n(t_s) - n(\infty)}\right)$$

and:

t=a time after completion of the control rod withdrawal step,
$n(t_s)$=the value of the output signal measured at a time $t_s$ following completion of the control rod withdrawal step,
n(t)=the value of the output signal measured at a time t following completion of the control rod withdrawal step, and
$n(\infty)$=the value of the output signal measured after neutron flux stops increasing.

Typical application of this methodology will require that the operator record source range detector signals immediately after the rods stop moving, at some time following the cessation of rod motion (but before the signal stops increasing), and after the signal stops increasing. The fact that the signal stops increasing may be determined graphically, visually, or by determining that the startup rate has returned to zero. The startup rate indication is the presently preferred embodiment, as this is the easiest to automate in KEEPS. The startup rate will be based on the observed change in the signal over a preset time. The elapsed time between the time of cessation of rod withdrawal and the time corresponding to the signal value recorded during the signal increase portion of the transient must also be determined. Inserting these values into the appropriate locations in the above equation for $K_{eff}$ will allow $K_{eff}$ to be calculated. The reactor operator may use this information to determine how subcritical the reactor is currently, and whether the next planned reactivity insertion will cause the reactor to exceed the desired reactivity state. Each step of the control bank withdrawal process has an expected value of $K_{eff}$ associated with it. The operator may first verify that the value of $K_{eff}$ is less than 1.0000, indicating that the reactor is subcritical, and then confirm that the actual value of $K_{eff}$ is in adequate agreement with the expected value of $K_{eff}$. The measured value of $K_{eff}$ can then be used to determine whether the next planned control bank withdrawal will cause the reactor to become critical. This process will ensure that the operator does not unexpectedly achieve criticality, and validate the predicted critical condition calculation well before an inaccurate calculation can cause a problem.

The method of this invention could be easily automated. A computer based system that detects the start and end of control bank motion and automatically records virtually continuous values of source range detector signals and the corresponding elapsed times from the cessation of control bank withdrawal could easily be developed. This type of system could use the data obtained at each time step following the stopping of rod motion to compute multiple and essentially independent values of $K_{eff}$ to provide the best possible estimate of the actual core subcritical eigenvalue corresponding to the current control bank configuration.

This invention provides a method and apparatus for estimating the effective neutron multiplication factor in a nuclear reactor. In the foregoing specification certain preferred practices and embodiments of this invention have been set out, however, it will be understood that the invention may be otherwise embodied within the scope of the following claims. For example, signals from the intermediate range detectors and the corresponding time information could also be used as inputs to the calculation algorithms. The data could either be automatically input to the calculation hardware (on-line mode), or could be input manually by the reactor operator (off-line mode). The required values of λ-effective and β-effective corresponding to the reactor depletion at the time of the calculation may be either manually input into the KEEPS calculation algorithm, or coded directly into in the computational software as a function of core depletion. It is therefore intended that the invention includes the elements of the following claims and equivalents thereof.

What is claimed is:

1. A method for determining the closeness to criticality of a nuclear reactor during start-up, comprising the steps of:

completing a control rod withdrawal step, thereby generating a change in an output signal of a neutron detector;

measuring the output signal after the completion of the control rod withdrawal step and during a transient portion of the output signal;

calculating the effective neutron multiplication factor ($K_{eff}$) based upon the measured output signal and elapsed time between the output signal measurements; and determining the closeness to criticality of the nuclear reactor based upon the calculated value of the effective neutron multiplication factor $K_{eff}$, wherein the step of calculating the effective neutron multiplication factor ($K_{eff}$) based upon the recorded output signals and elapsed time between at least two of the recorded signals, comprises the step of:

calculating the effective neutron multiplication factor ($K_{eff}$) using the following equations, $$K_{eff}(t_s) = 1 + \frac{\bar{\beta}}{1 + \frac{\lambda_{eff}}{\theta(t)}}$$

where,

β=effective 1-group delayed neutron fraction, $\lambda_{eff}$=effective 1-group neutron precursor decay constant, $$\theta(t) = \frac{1}{(t-t_s)} \ln\left(\frac{n(t) - n(\infty)}{n(t_s) - n(\infty)}\right)$$

and where, t=a time after completion of the control rod withdrawal step, n($t_s$)=the value of the output signal measured at a time $t_s$ following completion of the control rod withdrawal step, n(t)=the value of the output signal measured at a time t following completion of the control rod withdrawal step, and n(∞)=the value of the output signal measured after neutron flux stops increasing.

2. The method of claim 1, wherein the step of determining the closeness to criticality of the nuclear reactor based upon the calculated value of the effective neutron multiplication factor ($K_{eff}$), comprises the step of:

determining the time required for the output signal to achieve a specific fraction of an equilibrium signal level at the calculated value of the effective neutron multiplication factor ($K_{eff}$).

3. The method of claim 1, wherein the step of determining the closeness to criticality of the nuclear reactor based upon the calculated value of the effective neutron multiplication factor ($K_{eff}$), comprises the step of:

measuring the relative change in the output signal occurring in a predetermined time after the control rod withdrawal step.

* * * * *